3,184,461
CERTAIN 2-(DIALKYLAMINO)PYRIMIDINE COMPOUNDS
Ralph E. De Brunner, Dayton, Ohio, assignor to Monsanto Research Corporation, St. Louis, Mo., a corporation of Delaware
No Drawing. Filed Dec. 26, 1962, Ser. No. 247,342
3 Claims. (Cl. 260—256.4)

This invention relates to pyrimidine compounds and more particularly provides certain new and valuable dialkylaminopyrimidines, the method of preparing the same, and the method of actuating power-transmitting devices wherein the new compounds serve as functional fluids.

According to the invention, the presently provided pyrimidine compounds are prepared by the reaction of a 2-halopyrimidine with a dialkylamine having from 4 to 8 carbon atoms in each alkyl, substantially according to the scheme

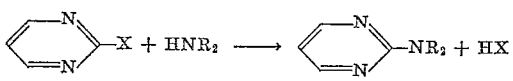

wherein R is alkyl of from 4 to 8 carbon atoms and X is halogen.

The useful halopyrimidines include 2-bromo-, 2-chloro-, 2-fluoro- or 2-iodopyrimidine. The useful amines are, e.g., di-n-butylamine, di-sec-butylamine, di-n-pentylamine, diisopentylamine, di-n-hexylamine, bis(2-ethylbutyl)amine, di-n-heptylamine, di-n-octylamine, n-butyl-n-hexylamine, isooctyl-n-pentylamine, etc. Thus reaction of 2-chloropyrimidine and di-n-pentylamine gives 2-di-n-pentylaminopyrimidine; 2-bromopyrimidine and diisobutylamine give 2-diisobutylaminopyrimidine; 2-iodopyrimidine and di-n-octylamine give 2-di-n-octylaminopyrimidine, 2-chloropyrimidine and n-hexylisopentylamine give 2-hexylisopentylaminopyrimidine, 2-bromopyrimidine and di-n-heptylamine give 2-di-n-heptylaminopyrimidine, etc.

Reaction of the 2-halopyrimidine with the dialkylamine takes place by heating the halo compound with the amine at a temperature of from, say, 70° C. to 225° C., in the presence or absence of an extraneous diluent or solvent. An excess of the amine reactant may be employed as the diluent. When using a solvent or diluent, operation at the refluxing temperature of the reaction mixture, at least toward the end of the reaction is a convenient means of assuring completion of the reaction within an economically feasible length of time. Examples of suitable diluents are the lower alkanols, e.g., methanol, ethanol or isopropanol, ethers such as diglyme or dioxane, amides such as dimethylformamide or dimethylacetamide, etc.

A catalyst may or may not be used. Operation in the presence of a basic agent is recommended, since it serves as a scavenger for the by-product hydrogen halide. The basic agent may be organic or inorganic and conveniently it may be an excess, over the stoichiometrically required amount, of the dialkylamine reactant. Said amine can thus serve as diluent and as hydrogen halide scavenger. Other basic compounds which may be used as scavengers are e.g., trialkylamines such as trimethylamine or tributylamine; the heterocyclic nitrogen bases such as N-methylmorpholine or pyridine; alkali or alkaline earth metal oxides or hydroxides or the basic salts thereof such as sodium, potassium, lithium, rubidium, calcium, barium or magnesium oxides, hydroxides, carbonates, acetates, etc.

All of the reaction conditions, i.e., whether or not diluent is employed and the nature of the diluent if one is used, basic agent, temperature, etc., can be readily arrived at by routine experimentation. Progress of the reaction can be followed by sampling at intervals and determining product formation by spectroscopic or other analytical means.

Since formation of the presently provided 2-dialkylaminopyrimidines proceeds by replacement of the pyrimidine halogen by the dialkylamino radical, the halopyrimidine and the dialkylamine are advantageously employed in at least a 1:1 molar ratio in order to obtain good yields of the 2-dialkylaminopyrimidines. However, as stated above, an excess over the 1:1 amine to halopyrimidine ratio is advantageously employed for the purpose of diluting the reaction mixture and/or serving as hydrogen halide scavenger. Also, as will be apparent to those skilled in the art there may be employed an excess of the halopyrimidine with respect to the amine, since any unreacted pyrimidine is readily separated from the final reaction product. An excess of halopyrimidine may be desirable when working with a difficultly available dialkylamine, in order to assure complete participation of the amine in the reaction.

The presently provided 2-dialkylaminopyrimidines are substantially non-hygroscopic materials which are generally fluids over a wide temperature range and possess very good thermal stability. Some of them remain liquid at temperatures which may be as low as —80° F., and remain liquid at temperatures which are substantially higher than 500° F. Hence they are eminently suited for use as functional fluids in power-transmitting devices. They find general use as hydraulic fluids, e.g., as brake fluids, clutch fluids and control fluids.

The presently provided 2-dialkylaminopyrimidines may be used alone as the functional fluid or they may be admixed with known fluids, e.g., the polyphenyls and halogen derivatives thereof, the polyphenyl ethers, the silanes, polyesters, etc. They may also be admixed with additives that are generally employed with functional fluids, e.g., antioxidants, anticorrosive agents, defoamants, etc., although for many purposes the use of such additives will be found to be unnecessary.

The invention is further illustrated by, but not limited to, the following examples.

Example 1

A mixture consisting of 34.4 g. (0.20 mole) of 2-chloropyrimidine and 181.3 g (1.5 moles) of di-n-butylamine was heated, with stirring, for 3.5 hours at 165° C. The whole was allowed to stand overnight at room temperature, and then the excess of di-n-butylamine was topped. There was thus recovered 70.0 g. of the amine. To the residual reaction mixture there was added 100 ml. of water, with stirring. Solid potassium hydroxide was added to make the system strongly basic, and the aqueous phase was separated. The organic phase was dried over potassium hydroxide pellets and then distilled from over the pellets under water pump vacuum to remove the remainder of unreacted amine. Distillation of the residue through a Vigreux column gave 51.1 g. (82% theoretical yield) of crude 2-dibutylaminopyrimidine, B.P. 100–104° C./1.4–1.6 mm., $n_D^{25}$ 1.5053. Redistillation gave the purer product, B.P. 133–134° C./9 mm., and analyzing as follows:

| Percent | Found | Calc'd for $C_{12}H_{22}N_3$ |
|---|---|---|
| C | 69.47 | 69.52 |
| H | 10.16 | 10.21 |
| N | 19.65 | 20.27 |

Infra-red analysis gave a spectrum consistent with the tertiary-amine structure.

The pour point of the 2-dibutylaminopyrimidine, determined by ASTM D97–57 procedure, was found to be —55° F.

Kinematic viscosity determinations by ASTM D445–T1960 procedure using thermometers which had been calibrated against a National Bureau of Standards resistance thermometer gave the following values.

| Temp. °F.: | centistokes |
|---|---|
| −30 | 774.5 |
| 25 | 39.42 |
| 100 | 5.01 |
| 210 | 1.32 |

*Example 2*

A mixture consisting of 28.64 g. (0.25 mole) of 2-chloropyrimidine and 301.84 g. (1.25 moles) of bis(2-ethylhexyl)amine was heated to 180° C. During initiation of the heating some of the 2-chloropyrimidine sublimed, but as the temperature rose, subliming ceased and that portion which had collected on the walls of the flask was returned to solution by vigorous stirring. Heating at 180° C. was continued for 4 hours. The whole was then allowed to stand overnight at room temperature and then stirred for 4 hours with a solution of 28 g. (0.5 mole) of potassium hydroxide in 125 ml. of water. The water phase separated, and the remaining phase was distilled to recover 240.5 g. of the excess, unreacted bis(2-ethylhexyl) amine. Distillation of the residue gave a fraction, B.P. 147–149° C./0.9 mm., $n_D^{25}$ 1.4935, which upon redistillation gave the substantially pure 2-bis(2-ethylhexyl) aminopyrimidine, B.P. 142–3/0.7 mm., and analyzing as follows:

| Percent | Found | Calcd. for $C_{20}H_{35}N_3$ |
|---|---|---|
| C | 75.18 | 75.17 |
| H | 11.75 | 11.64 |

Infra-red analysis confirmed the structure, and vapor phase chromatography confirmed the purity.

Testing of the 2-bis(2-ethylhexyl)aminopyrimidine for functional fluid efficacy was conducted by determining such characteristics as kinematic viscosity, pour point and decomposition point.

Kinematic viscosity was determined by ASTM D445–T1960 procedure employing standard ASTM kinematic viscosity thermometers, each calibrated against a National Bureau of Standards resistance thermometer. The following results were obtained at the indicated temperatures.

| Temp. °F.: | centistokes |
|---|---|
| −20 | 15,460 |
| 25 | 402.5 |
| 100 | 21.39 |
| 210 | 3.10 |

The pour point, determined by ASTM D97–57 procedure, was found to be −40° F.

Determination of the decomposition temperature on the isoteniscope gave a value of 596° F. The decomposition temperature is here defined as the temperature at which $dp/dt$ (rate of pressure rise) due to decomposition of the sample is 0.014 mm. Hg/second.

I claim:
1. 2-dialkylaminopyrimidine in which each alkyl has from 4 to 8 carbon atoms.
2. 2-dibutylaminopyrimidine.
3. 2-bis(2-ethylhexyl)aminopyrimidine.

References Cited by the Examiner

UNITED STATES PATENTS

| | | | |
|---|---|---|---|
| 2,224,811 | 12/40 | English | 260—256.4 |
| 2,224,836 | 12/40 | Roblin | 260—256.4 |
| 2,385,761 | 9/45 | Kyrides | 260—256.4 |
| 2,688,598 | 9/54 | McNeely | 252—77 |
| 3,057,803 | 10/62 | Benz et al. | 252—77 |

FOREIGN PATENTS 822,069  10/59  Great Britain.

OTHER REFERENCES

Cutting et al.: Chem. Abstracts, vol. 47, page 4473a (1953).

Organic Syntheses, vol. 35, T. L. Cairns, editor, (New York), 1955, pp. 58–59.

NICHOLAS S. RIZZO, *Primary Examiner.*

DUVAL T. McCUTCHEN, *Examiner.*